(12) United States Patent
Katsuma et al.

(10) Patent No.: US 7,580,601 B2
(45) Date of Patent: Aug. 25, 2009

(54) ANAMORPHIC ASPHERICAL BEAM FOCUSING LENS

(75) Inventors: Toshiaki Katsuma, Tokyo (JP); Koichi Noguchi, Saitama (JP)

(73) Assignee: Fujinon Corporation, Saitama (JP)

( * ) Notice: Subject to any disclaimer, the term of this patent is extended or adjusted under 35 U.S.C. 154(b) by 649 days.

(21) Appl. No.: 10/991,484

(22) Filed: Nov. 19, 2004

(65) Prior Publication Data

US 2005/0111338 A1 May 26, 2005

(30) Foreign Application Priority Data

Nov. 21, 2003 (JP) .............................. 2003-392675

(51) Int. Cl.
*G02B 6/32* (2006.01)
(52) U.S. Cl. ....................................................... 385/33
(58) Field of Classification Search ................... 385/33
See application file for complete search history.

(56) References Cited

U.S. PATENT DOCUMENTS

| 4,915,484 | A | 4/1990 | Yamamoto |
| 5,293,269 | A | 3/1994 | Burkhart et al. |
| 5,768,024 | A | 6/1998 | Takahashi |
| 6,026,206 | A | 2/2000 | Gaebe |
| 6,195,208 | B1 | 2/2001 | Ngoi et al. |
| 6,370,298 | B1 | 4/2002 | Koops |
| 6,724,544 | B2 | 4/2004 | Kishima et al. |
| 7,292,397 | B2 * | 11/2007 | Hatade et al. ................ 359/718 |
| 2003/0090987 | A1 * | 5/2003 | Kitahara et al. ......... 369/112.24 |

FOREIGN PATENT DOCUMENTS

| JP | S57-176014 | 10/1982 |
| JP | 2001-188151 | 7/2001 |

* cited by examiner

*Primary Examiner*—Uyen Chau N Le
*Assistant Examiner*—Hoang Tran
(74) *Attorney, Agent, or Firm*—Arnold International; Jon W. Henry; Bruce Y. Arnold

(57) ABSTRACT

A beam focusing lens having an optical axis for focusing at a point of focus a light beam having different angles of divergence in orthogonal directions perpendicular to the optical axis consists of one or two lens components, each of which may be a single lens element and made of plastic and each of which has positive refractive power. At least one lens surface is an anamorphic aspherical surface that is not a cylindrical surface, that has no cross-section perpendicular to the optical axis that is circular with a finite radius of curvature, and that is defined by a particular aspherical equation. Another lens surface may be a cylindrical aspherical surface defined by another particular aspherical equation. The beams focusing lens may satisfy certain conditions related to optical element spacings, refractive index of a single lens element, and magnifications, and may focus light from a semiconductor laser into an optical fiber.

14 Claims, 9 Drawing Sheets

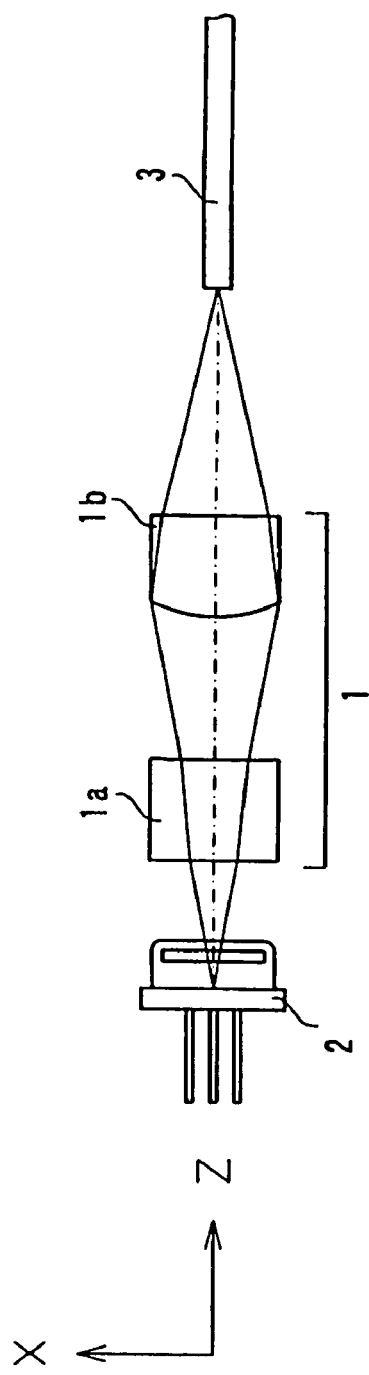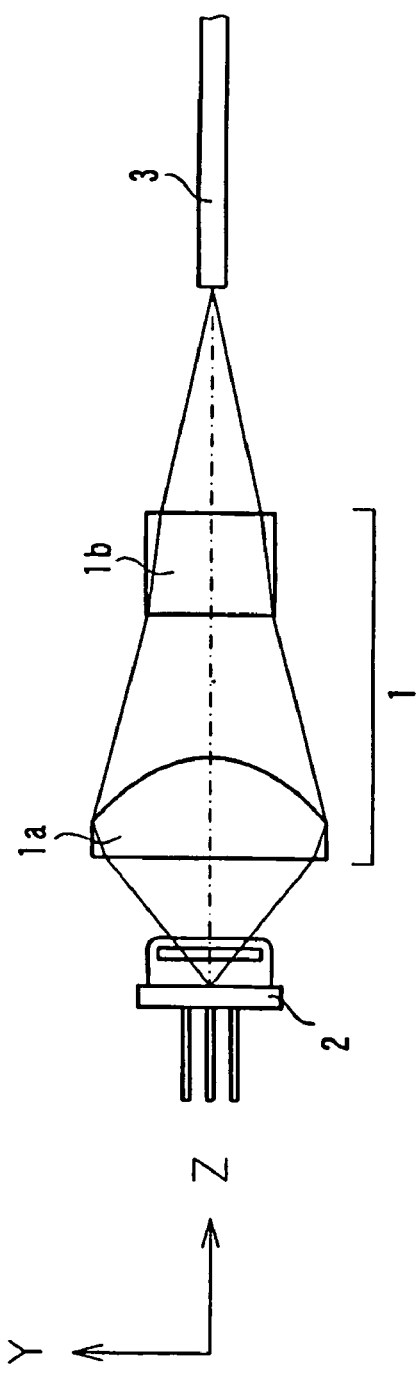
Fig. 1A
Fig. 1B

ANAMORPHIC ASPHERICAL BEAM FOCUSING LENS

FIELD OF THE INVENTION

The present invention relates to a beam focusing lens for efficiently collecting and focusing a light beam emitted from a semiconductor laser that has different angles of divergence in orthogonal directions perpendicular to the optical axis of the beam focusing lens.

BACKGROUND OF THE INVENTION

Beam focusing lenses for focusing light from a semiconductor laser are known. For example, Japanese Laid-Open Patent Applications S57-176014 and 2001-188151 disclose beam focusing lenses that include two cylindrical lenses with orthogonal axes of symmetry that collect and focus light beams that have different angles of divergence in directions orthogonal to their optical axes from a semiconductor laser. The beam focusing lenses provide circular or nearly circular output beams.

However, in practice, the two cylindrical lenses with the axes of symmetry orthogonal to one another do not always efficiently collect the diverging light from the light source. FIG. 12 is a light spot diagram of light collected by such a prior art beam focusing lens. The two cylindrical lenses collect light diverging in cross-sections in which the cylindrical surfaces have refractive powers. However, light diverging in other directions is not adequately collected. As shown in FIG. 12, light collection is insufficient at the angles of 45 degrees in relation to the horizontal and vertical directions of FIG. 12 that correspond to the directions of the axes of symmetry and of maximum refractive power of the cylindrical lenses, especially at distances farther from the center of light collection.

Using more cylindrical lenses to efficiently collect light in the directions in which light collection is insufficient as described above is impractical because of the complexity of designing and adjusting optical systems with more cylindrical lenses.

BRIEF SUMMARY OF THE INVENTION

The present invention relates to a beam focusing lens of simple structure that efficiently collects and focuses a light beam that has different angles of divergence in orthogonal directions perpendicular to the optical axis of the beam focusing lens, such as a light beam from a semiconductor laser.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A-1B are orthogonal cross-sectional schematic diagrams of a beam focusing lens arrangement of Embodiment 1 of the present invention;

DETAILED DESCRIPTION

Figure 2A:
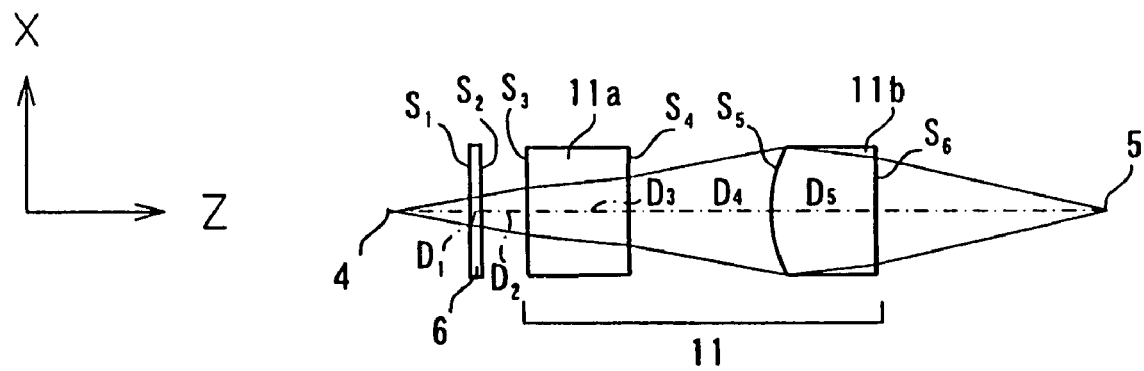
FIGS. 2A-2B are orthogonal cross-sectional schematic diagrams of a beam focusing lens of Embodiment 1.

First, definitions of the terms "lens element" and "lens component" that relate to this detailed description will be given. The term "lens element" is herein defined as a single transparent mass of refractive material having two opposed refracting surfaces, which surfaces are positioned at least generally transversely of the optical axis of the beam focusing lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The beam focusing lens according to the present invention consists of one or two lens components, each of which may be a lens element, and includes at least one surface that is what is herein termed an "anamorphic aspherical surface" (also herein abbreviated as an "ANA surface"). The term "anamorphic aspherical surface" is used herein to mean an anamorphic surface that is not a cylindrical surface and that has no cross-section perpendicular to the optical axis that is circular with a finite radius of curvature.

Five embodiments of the beam focusing lens of the present invention will be described below with reference to the drawings.

Embodiment 1

Embodiment 1 of the present invention will be described with reference to FIGS. 1A-1B. In FIGS. 1A-1B, some elements are enlarged for clarity of illustration. As shown in FIGS. 1A and 1B, in Embodiment 1 a beam focusing lens 1 collects incident light from a light beam emitted from a semiconductor laser 2 that has different angles of divergence in orthogonal directions perpendicular to the optical axis of the beam focusing lens. These two directions are hereafter sometimes referred to as "the vertical and horizontal directions" in a plane that is orthogonal to the optical axis of the beam focusing lens 1. The beam focusing lens 1 also focuses the light of the light beam at the end of an optical fiber 3, as shown in FIGS. 1A-1B.

Herein, the term "beam diverging angle" is used to define the angle of divergence of the light beam from a point in the semiconductor laser 2 where the light beam at least approximately originates measured as the full vertex angle of divergence in a given cross-section perpendicular to the optical axis of the beam focusing lens 1. The beam diverging angles vary in different cross-sections perpendicular to the optical axis of the beam focusing lens 1, and the beam diverging angles define a cone with an elliptical base orthogonal to the optical axis of the beam focusing lens 1. The major and minor axes of the ellipse intersect on the optical axis of the beam focusing lens 1 and the optical axis of the beam focusing lens 1 also passes through the vertex of the cone formed by the diverging beam angles. Current semiconductor lasers generally produce divergent beams having ellipsoidal cross-sections with beam diverging angles of approximately 10 degrees in the horizontal direction and approximately 30 degrees in the vertical direction in relation to the semiconductor laser active layer, yielding a ratio of minor axis to major axis of approximately 1:2.5 to 1:3. In FIGS. 1A-1B, the optical axis is referenced as the Z-axis, the direction in which a semiconductor laser beam has a smaller beam diverging angle is referred to as the X-axis (hereinafter sometimes referred to as "the minor axis direction"), and the direction in which a semiconductor laser beam has a larger beam diverging angle is referred to as the Y-axis (hereinafter sometimes referred to as "the major axis direction").

The beam focusing lens 1 consists of two lens elements 1a and 1b, each of which has positive refractive power and at least one of which includes an anamorphic aspherical surface that is defined using the following equation:

$$Z = (C_x \cdot X^2 + C_y \cdot Y^2)/(1 + \{1-(K_x \cdot C_x^2 \cdot X^2 + K_y \cdot C_y^2 \cdot Y^2)\}^{1/2}) + \Sigma A_i \{(1-B_i)X^2 + (1+B_i)Y^2\}^i \quad \text{Equation (A)}$$

where
- X is the distance (in mm) from the optical axis in a first direction of a point on the anamorphic aspherical surface,
- Y is the distance (in mm) from the optical axis in a second direction that is orthogonal to the first direction of the point on the anamorphic aspherical surface,
- Z is the length (in mm) of a line drawn from the point on the anamorphic aspherical surface at the coordinate distances X and Y from the optical axis to the tangential plane of the anamorphic aspherical surface vertex,
- Cx is the curvature (=1/the radius of curvature, R in mm) in the first direction of the anamorphic aspherical surface on the optical axis,
- Cy is the curvature (=1/the radius of curvature, R in mm) in the second direction of the anamorphic aspherical surface on the optical axis,
- Kx is the eccentricity in the first direction,
- Ky is the eccentricity in the second direction,
- $A_i$ is the ith first aspherical coefficient,
- $B_i$ is the ith second aspherical coefficient, and
- the summation extends over i.

Using at least one anamorphic aspherical surface enables a relatively simple lens structure to efficiently collect and focus light beams having different beam diverging angles in the vertical and horizontal directions. In contrast, when the prior art two cylindrical lens arrangement with axes of symmetry orthogonal to each other and coinciding with the vertical and horizontal directions is used to collect and focus incident light having different beam diverging angles in the vertical and horizontal directions, light collection and focusing is insufficient in the direction at 45 degrees in relation to the two directions of the axes of symmetry and too much light is spread too far from the optical axis to provide a sharp focus. The present invention uses an anamorphic aspherical surface, which is continuously curved, so that not only light emitted in the vertical and horizontal directions is sharply focused but also light emitted in other directions is sharply focused.

The beam focusing lens 1 is designed to efficiently focus light into the end of an optical fiber 3 having a core diameter of 100 μm or smaller. Therefore, it is desirable to design an anamorphic aspherical surface of the beam focusing lens 1 so the light beam focus is sharply defined near the entrance point of the core at the end of the optical fiber 3. Thus, it is desirable to design an anamorphic aspherical surface of the beam focusing lens 1 so that the beam focusing lens 1 focuses light to a beam spot centered on the optical axis and near the entrance point of the optical fiber 3 and so that the beam spot has a smaller diameter than the core diameter.

At least one of the two lens elements 1a and 1b of the beam focusing lens 1 can be made of plastic in order to reduce production costs.

When only one of the two lens elements 1a and 1b is made of plastic, it is preferable that the lens element 1b, that is, the lens element on the beam point of focus side of the beam focusing lens 1 and that focuses incident light on the optical fiber, be made of plastic. In this case, the other lens element 1a is made of a material having a larger refractive index than plastic, such as glass. In this way, the lens element that preferably has larger refractive power corresponding to the direction with the larger beam diverging angle is made of a material having a larger refractive index, and the other lens element is made of plastic having a smaller refractive index, so that an inexpensive beam focusing lens having reduced aberrations can be obtained. This is based on the fact that, with current semiconductor lasers, beam diverging angles in the Y-Z cross-section are larger than beam diverging angles in the X-Z cross-section, as shown in FIGS. 1A-1B.

When a semiconductor laser light source that can produce a beam diverging in a right circular cone form rather than in the current form becomes available, the beam diverging angles of incident light and the converging angles of exit light of the two lens elements should be compared and, preferably, the lens element that has the larger diverging and converging angles will be made of a material having a larger refractive index and the other lens element will be made of plastic.

When the beam diverging angles of incident light and the converging angles of exit light of the two lens elements are sufficiently smaller than according to current technologies, both lens elements can be made of plastic in order to obtain an inexpensive beam focusing lens having reduced aberrations.

Figure 2B:
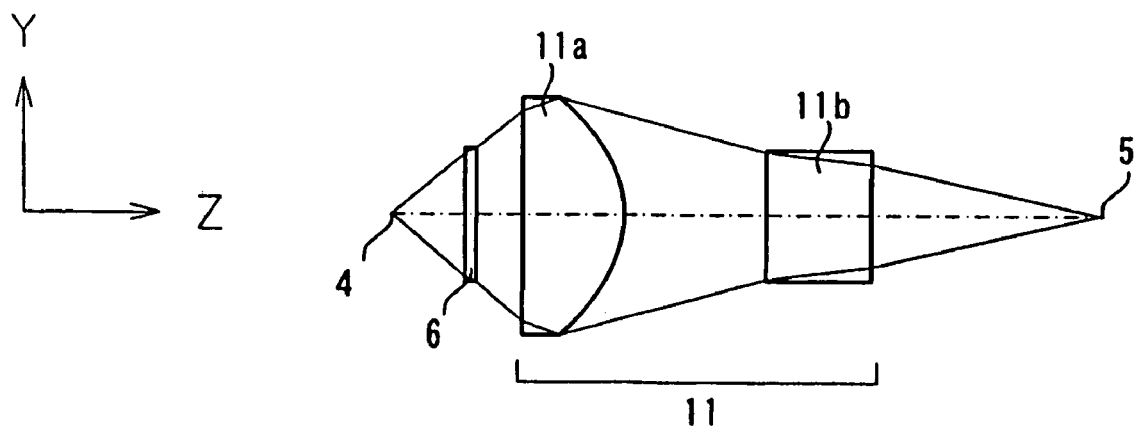
Figure 12:
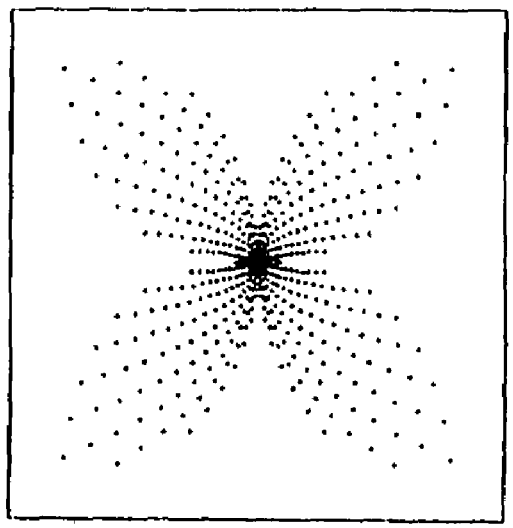
FIG. 12 is a light spot diagram at the plane of focus of a prior art beam focusing lens.

FIGS. 1A-1B are orthogonal cross-sectional schematic diagrams of a beam focusing lens arrangement of Embodiment 1 that is very similar to FIGS. 2A-2B which are orthogonal cross-sectional schematic diagrams of a beam focusing lens of Embodiment 1. In the description of this beam focusing lens and the descriptions of Embodiments 2 of the beam focusing lens of the present invention that follows, as well as in Embodiments 3-5 that will be described later, the optical axis is referred to as the Z-axis, the direction in which light emitted from a semiconductor laser defines the minor axis is referred to as the direction of the X-axis, and the direction in which light emitted from the semiconductor laser defines the major axis is referred to as the direction of the Y-axis. Beam focusing lenses according to all of Embodiments 1-5 below collect light from a light source, which may be a semiconductor laser, then emit the light in a converging beam that is focused into an optical fiber. In FIGS. 2A-2B through FIGS. 6A-6B, optical structures are shown schematically, a semiconductor laser light source is indicated only by an emission point 4 and an optical fiber is indicated only by a point of focus 5. The term "point of focus" includes a circular beam spot having a very small diameter about a center point in a plane orthogonal to the optical axis at a specified position. The phrase "very small diameter" will be understood to mean a beam spot that occupies a much smaller area than that of the light spot diagram of FIG. 12, for example, comparable to beam spots shown in FIGS. 7 and 8 with regard to Embodiments 1 and 2, respectively. This enables the light collected at the point of focus to be efficiently coupled into a very small end of an optical fiber that is positioned at the specified position of the point of focus. A semiconductor laser cover glass 6 is also shown in FIGS. 2A-2B through FIG. 6A-6B.

Figure 3A:
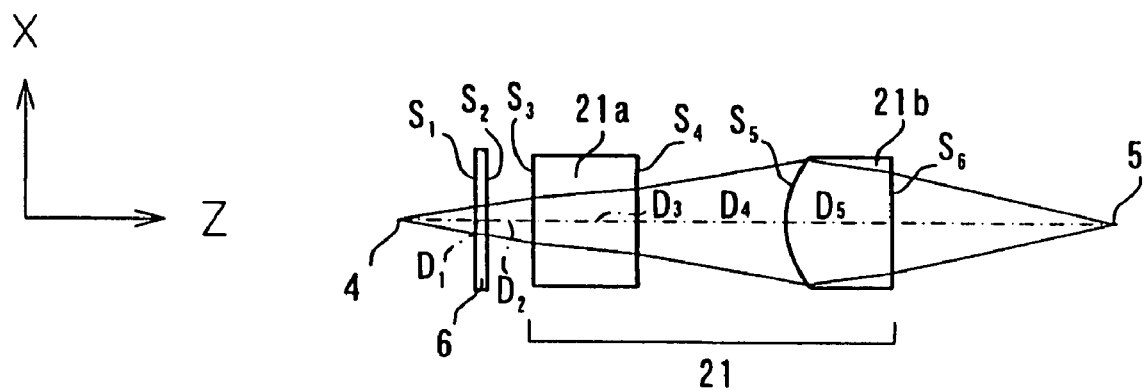
FIGS. 3A-3B are orthogonal cross-sectional schematic diagrams of a beam focusing lens of Embodiment 2 of the present invention.

As shown in FIGS. 2A-2B, a beam focusing lens 11 consists of two lens elements 11a and 11b, each of which has positive refractive power. The point of focus side of the lens element 11a and the light source side surface of the lens element 11b are anamorphic aspherical surfaces. These anamorphic aspherical surfaces are expressed by Equation (A) above. In FIG. 2A, the surfaces of the optical elements are referenced by the letter S with a subscript denoting their order from the light source side of the beam focusing lens, from $S_1$ to $S_6$. The on-axis surface spacings along the optical axis, the Z-axis, between the surfaces of the optical elements are referenced by the letter D with a subscript denoting their order from the light source side of the beam focusing lens, from $D_1$ to $D_5$. FIG. 3A similarly denotes the surfaces of the optical elements and the on-axis surface spacings for Embodiment 2 of the present inventions. In a similar manner, FIGS. 4A, 5A, and 6A denote the surfaces of the optical elements, from $S_1$ to $S_4$, and the on-axis surface spacings, from $D_1$ to $D_3$, for Embodiments 3-5 of the present invention, based on a single lens element being used in Embodiments 3-5.

Table 1 below lists the surface number #, in order from the light source side, the radius of curvature R (in mm) of each surface on the optical axis, the on-axis surface spacing D (in mm), as well as the refractive index N (at a wavelength of 815 nm) of each optical element for the beam focusing lens 11 of FIGS. 2A-2B (Embodiment 1).

TABLE 1

| # | R | D | N |
|---|---|---|---|
| 1 | ∞ | 0.250 | 1.51002 |
| 2 | ∞ | 1.000 | |
| 3 | ∞ | 2.250 | 1.87190 |
| 4 | ANA | 3.123 | |
| 5 | ANA | 2.250 | 1.87190 |
| 6 | ∞ | | |

Surfaces 1 and 2 in Table 1 are planar surfaces of a semiconductor laser cover glass. ANAs are anamorphic aspherical surfaces as previously defined.

Table 2 below lists the values of the aspherical constants Cx, Cy, Kx, Ky, the first aspherical coefficients $A_2$-$A_5$ and the second aspherical coefficients $B_2$-$B_5$, which are also aspherical constants, used in Equation (A) above for each of the ANA surfaces of Table 1. Aspherical coefficients that are not present in Table 2 are zero. An "E" in the data indicates that the number following the "E" is the exponent to the base 10. For example, "1.0E–2" represents the number $1.0 \times 10^{-2}$.

TABLE 2

| # | Cx | Cy | $A_2$ | $A_3$ |
|---|---|---|---|---|
| 4 | 0.000000000 | –4.136897678E–1 | –2.610431222E–4 | 1.023128903E–3 |
| 5 | 3.487992127E–1 | 0.000000000 | –2.948903660E–3 | 7.389508420E–5 |

| # | $A_4$ | $A_5$ | Kx | Ky |
|---|---|---|---|---|
| 4 | –4.436655270E–7 | 3.1743920000E–8 | 0.000000000 | 0.000000000 |
| 5 | –3.468058346E–5 | 8.193144070E–7 | 0.000000000 | 0.000000000 |

| # | $B_2$ | $B_3$ | $B_4$ | $B_5$ |
|---|---|---|---|---|
| 4 | 1.505614435 | –5.157376431E–1 | 1.269748809 | 8.752990826E–1 |
| 5 | 1.872493950E–1 | –1.345793119 | –7.686495221E–1 | –1.024302988 |

In Embodiment 1 of FIGS. 2A and 2B, the design wavelength is 815 nm and the various distances listed below are based on using light of that wavelength. The distance between the light source side surface $S_3$ of the light source side lens element 11a and the emission point 4 of the light source is –2.839 mm. This distance would be –2.755 mm if the cover glass 6 of the semiconductor laser were not present, and the distance between the light source side surface $S_3$ of the light source side lens element 11a and the emission point 4 of the light source without the cover glass present will be denoted as the distance $L_1$. The distance $L_2$ between the beam focusing side surface $S_6$ of the beam focusing side lens element 11b and the point of focus 5 is 4.938 mm. The distance between the emission point 4 and the point of focus 5 is 15.400 mm.

Figure 5A:
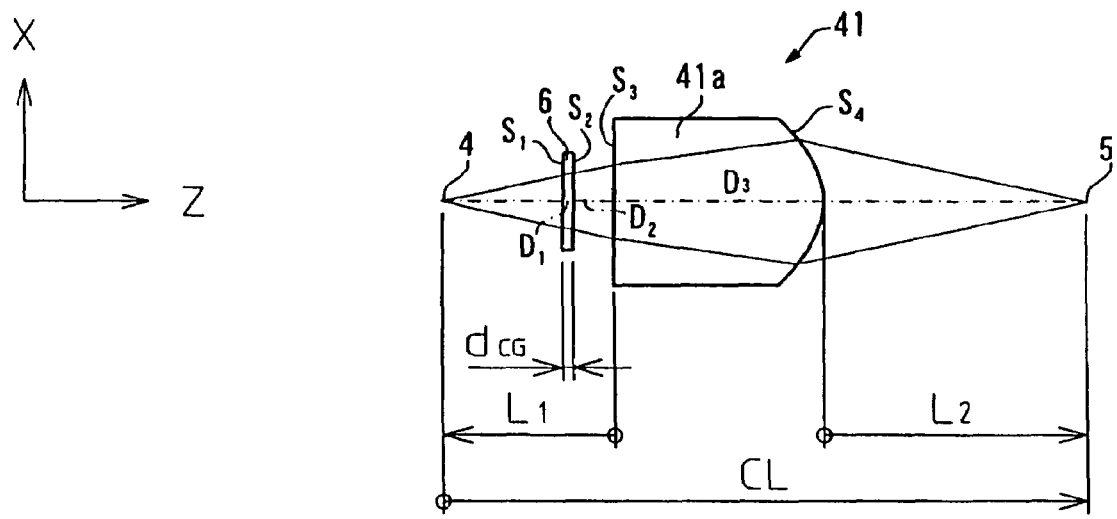
FIGS. 5A-5B are orthogonal cross-sectional schematic diagrams of a beam focusing lens of Embodiment 4 of the present invention.
Figure 5B:
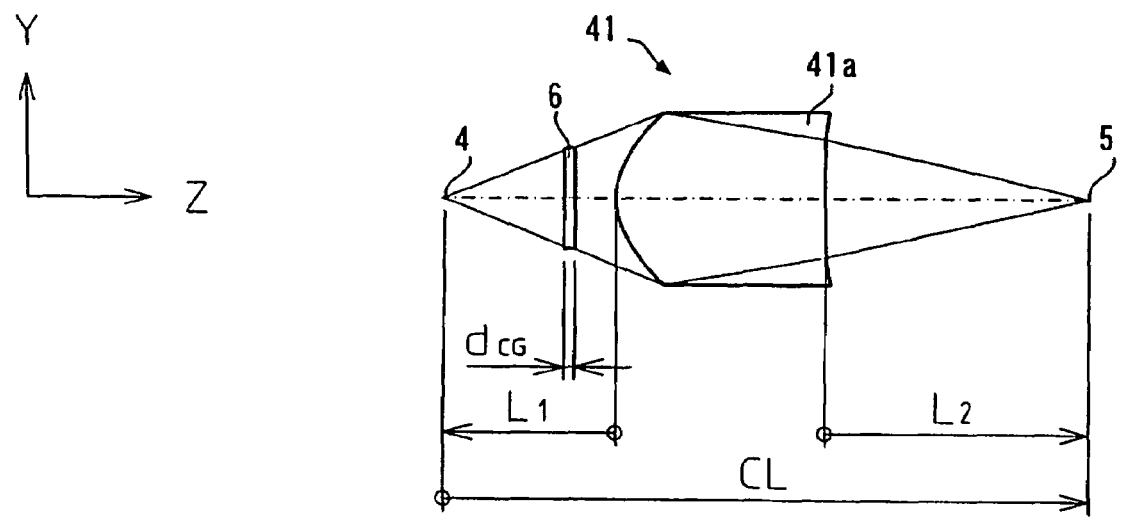

This distance would be 15.316 mm if the cover glass 6 of the semiconductor laser were not present, and the distance between the emission point 4 and the point of focus 5 without the cover glass present will be denoted as the distance CL. FIGS. 5A and 5B show the distances $L_1$, $L_2$, and CL which, as noted above, are computed values when the cover glass, which has a thickness $d_{CG}$ is removed. The focal length of the beam focusing lens 11 in the X-Z cross-section is 3.288 mm, and the focal length of the beam focusing lens 11 in the Y-Z cross-section is 2.772 mm. The image magnification in the X-Z cross-section is −0.86726. The image magnification in the Y-Z cross-section is −2.34108 mm.

Figure 7:
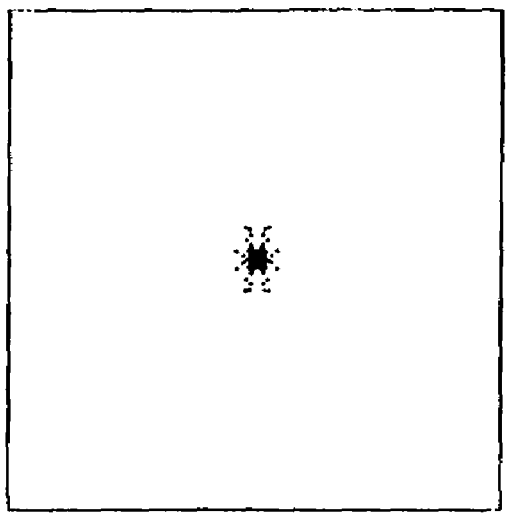
FIG. 7 is a light spot diagram at the plane of focus of the beam focusing lens of FIGS. 2A-2B (Embodiment 1) of the present invention.

FIG. 7 is a light spot diagram at the plane of focus of the beam focusing lens 11 of FIGS. 2A-2B (Embodiment 1) of the present invention. The plane of focus is perpendicular to the Z-axis, the optical axis, of the beam focusing lens 11. In this light spot diagram, the semiconductor laser light source and the spot diagram scale are provided in the same manner as for the prior art embodiment described previously with regard to FIG. 12. By comparing FIG. 7 and FIG. 12, it is obvious that the beam focusing lens 11 of Embodiment 1 of the present invention provides a simple lens structure that efficiently collects and focuses light diverging in the vertical and horizontal directions but also efficiently collects and focuses to a central area light diverging in other directions where insufficient light collection and focusing is observed in the prior art lens structures.

Embodiment 2

Figure 3B:
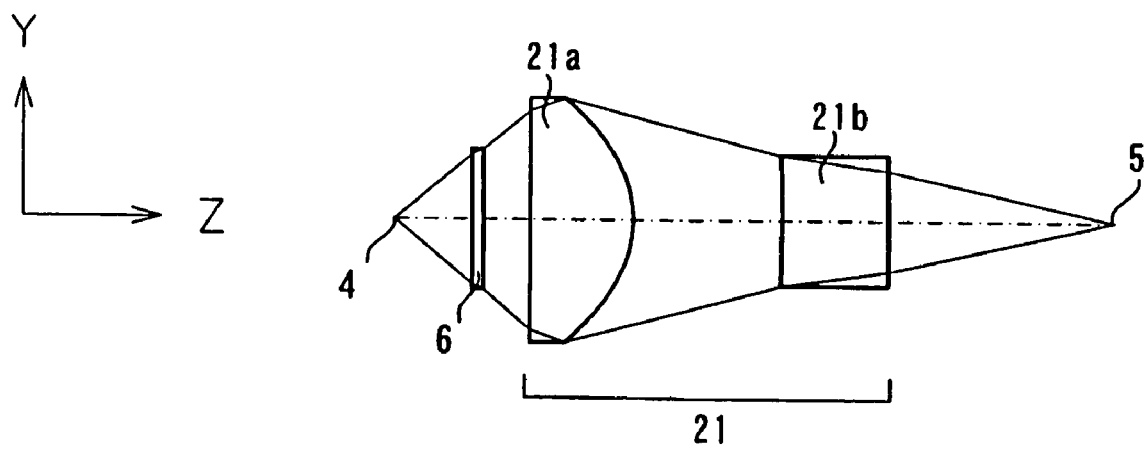

FIGS. 3A-3B are orthogonal cross-sectional schematic diagrams of a beam focusing lens of Embodiment 2 of the present invention. Embodiment 2 is very similar to Embodiment 1. As shown in FIGS. 3A-3B, a beam focusing lens 21 consists of two lens elements 21a and 21b, each of which has positive refractive power. The point of focus side of the lens element 21a and the light source side surface of the lens element 21b are anamorphic aspherical surfaces, that is, ANAs. Those anamorphic aspherical surfaces are expressed by Equation (A) above. Lens element 21a is made of glass and lens element 21b is made of plastic. Embodiment 2 differs from Embodiment 1 of FIGS. 2A and 2B in its lens element configuration such as different aspherical coefficients of the ANAs, one different optical element surface spacing, and one different refractive index.

Table 3 below lists the surface number #, in order from the light source side, the radius of curvature R (in mm) of each surface on the optical axis, the on-axis surface spacing D (in mm), as well as the refractive index N (at a wavelength of 815 nm) of each optical element for the beam focusing lens 21 of Embodiment 2.

TABLE 3

| # | R | D | N |
|---|---|---|---|
| 1 | ∞ | 0.250 | 1.51002 |
| 2 | ∞ | 1.000 | |
| 3 | ∞ | 2.250 | 1.87190 |
| 4 | ANA | 3.177 | |
| 5 | ANA | 2.250 | 1.57039 |
| 6 | ∞ | | |

Surfaces #1 and #2 in Table 3 are planar surfaces of a semiconductor laser cover glass. ANAs are anamorphic aspherical surfaces as previously defined.

Table 4 below lists the values of the constants Cx, Cy, Kx, Ky, the first aspherical coefficients $A_2$-$A_5$ and the second aspherical coefficients $B_2$-$B_5$, which are also aspherical constants, used in Equation (A) above for each of the ANA surfaces of Table 3. Aspherical coefficients that are not present in Table 4 are zero. An "E" in the data indicates that the number following the "E" is the exponent to the base 10. For example, "1.0E−2" represents the number $1.0 \times 10^{-2}$.

TABLE 4

| # | Cx | Cy | $A_2$ | $A_3$ |
|---|---|---|---|---|
| 4 | 0.000000000 | −4.065917741E−1 | −2.530095215E−4 | 1.040886109E−3 |
| 5 | 5.240296541E−1 | 0.000000000 | −4.371292115E−3 | 1.107848392E−4 |

| # | $A_4$ | $A_5$ | Kx | Ky |
|---|---|---|---|---|
| 4 | −6.436543910E−7 | 4.644865600E−8 | 0.000000000 | 0.000000000 |
| 5 | −3.463951741E−5 | 8.274515810E−7 | 0.000000000 | 0.000000000 |

| # | $B_2$ | $B_3$ | $B_4$ | $B_5$ |
|---|---|---|---|---|
| 4 | 1.507751250 | −4.900946498E−1 | 1.270465212 | 8.749770213E−1 |
| 5 | 1.717436144E−1 | −1.348934052 | −7.656262233E−1 | −1.024699737 |

In Embodiment 2 of FIGS. 3A and 3B, the design wavelength is 815 nm and the various distances listed below are based on using light of that wavelength. The distance between the light source side surface $S_3$ of the light source side lens element 21a and the emission point 4 of the light source is −2.908 mm. This distance would be −2.824 mm if the cover glass 6 of the semiconductor laser were not present, and the distance between the light source side surface $S_3$ of the light source side lens element 21a and the emission point 4 of the light source without the cover glass present will be denoted as the distance $L_1$. The distance $L_2$ between the beam focusing side surface $S_6$ of the beam focusing side lens element 21b and the point of focus 5 is 4.815 mm. The distance between the emission point 4 and the point of focus 5 is 15.400 mm. This distance would be 15.316 mm if the cover glass 6 of the semiconductor laser were not present, and the distance between the emission point 4 and the point of focus 5 without the cover glass present will be denoted as the distance CL. The focal length of the beam focusing lens 21 in the X-Z cross-section is 3.346 mm, and the focal length of the beam focusing lens 21 in the Y-Z cross-section is 2.821 mm. The image magnification in the X-Z cross-section is −0.86737. The image magnification in the Y-Z cross-section is −2.34108 mm.

Figure 8:
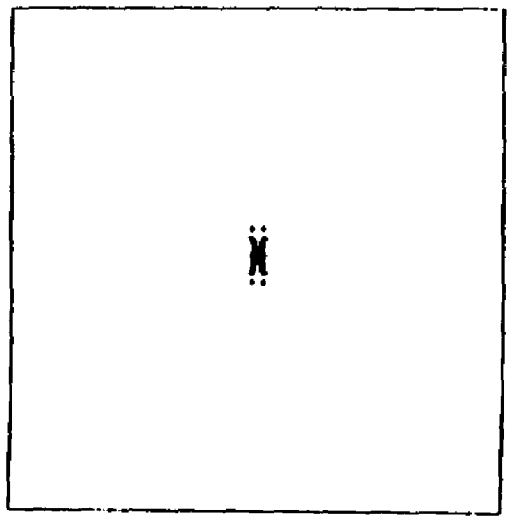
FIG. 8 is a light spot diagram at the plane of focus of the beam focusing lens of Embodiment 2 of the present invention.

FIG. 8 is a light spot diagram at the plane of focus of the beam focusing lens 21 of Embodiment 2 of the present invention. The plane of focus is perpendicular to the Z-axis, the optical axis, of the beam focusing lens 21. In this light spot diagram, the semiconductor laser light source and the spot diagram scale are provided in the same manner as for the prior art embodiment described previously with regard to FIG. 12. By comparing FIG. 8 and FIG. 12, it is obvious that the beam focusing lens 21 of Embodiment 2 of the present invention provides a simple lens structure that efficiently collects and focuses light diverging in the vertical and horizontal directions but also efficiently collects and focuses to a central area light diverging in other directions where insufficient light collection and focusing is observed in the prior art lens structures.

Embodiment 3

Figure 4A:
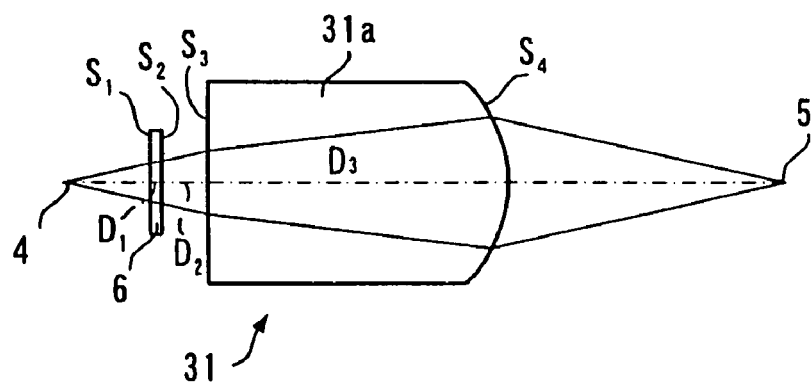
FIGS. 4A-4B are orthogonal cross-sectional schematic diagrams of a beam focusing lens of Embodiment 3 of the present invention.
Figure 4B:
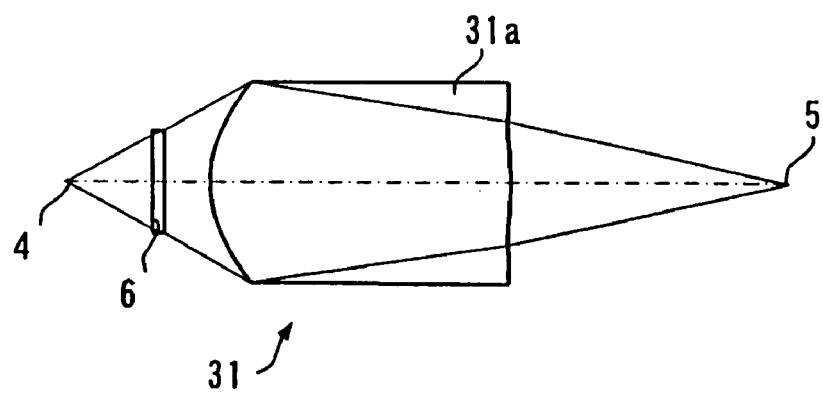

FIGS. 4A-4B are orthogonal cross-sectional schematic diagrams of a beam focusing lens of Embodiment 3 of the present invention. Embodiment 3 differs from Embodiments 1 and 2, described previously, in that it relates generally to a beam focusing lens that consists of a single lens component that has at least one anamorphic aspherical surface expressed by Equation (A) above. More specifically, in Embodiment 3, as well as in Embodiments 4 and 5 that will be described later, the beam focusing lens is a single lens element that has one anamorphic aspherical surface expressed by Equation (A) above. The beam focusing lenses of Embodiments 3-5 are also suitable for collecting and focusing light emitted from a semiconductor laser light source having different beam diverging angles in two orthogonal directions in a plane that is orthogonal to the optical axis into an optical fiber.

The beam focusing lenses of Embodiments 3-5 are designed so that the anamorphic aspherical surface enables collecting and focusing not only light diverging in two orthogonal directions in a plane that is orthogonal to the optical axis but also light diverging in other directions where light collection and focusing is insufficient in the prior art beam focusing lenses. Consequently, light having different beam diverging angles in the vertical and horizontal directions can be efficiently collected with a simple lens structure.

It is desirable that the anamorphic aspherical surface be designed to form a light collecting point or point of focus at a specified position that may act as the entrance point to an optical fiber. This enables the light collected at the point of focus to be efficiently coupled into a very small end of an optical fiber that is positioned at the specified position of the point of focus.

Using a single lens element, instead of two lens elements as in Embodiments 1 and 2 described previously, makes alignment easier and reduces production costs of the beam focusing lens. However, it is easier to obtain different magnifications in the vertical and horizontal directions by adjusting the positions of the two lens elements in order to focus light having different beam diverging angles in the vertical and horizontal directions to a spot at a specified position than when using a single lens element because when using a single lens element, a smaller number of lens parameters are variable, which makes adjusting the magnifications complicated.

It is preferable that the anamorphic aspherical surface of the beam focusing lens has a curvature of zero (radius of curvature equal to infinity) on the optical axis in a specified direction and satisfies the following Conditions (1) and (2) in order to facilitate the adjustment regarding magnification of the beam focusing lens consisting of a single lens element:

$$L_1 = \{N \cdot CL \cdot (\beta_2 - 1)\} / \{(\beta_2 - N)(N \cdot \beta_1 - 1) + (N-1)(N-1)\beta_2\} \quad \text{Condition (1)}$$

$$L_2 = \{N \cdot \beta_2 \cdot CL(1 - \beta_1)\} / \{\beta_2(N-1)(1-N) + (N \cdot \beta_1 - 1)(N - \beta_2)\} \quad \text{Condition (2)}$$

where $\beta_1$ is the larger of the absolute values of two image magnifications in orthogonal directions of larger and smaller divergence of an incident light beam, $\beta_2$ is the smaller of the absolute values of the two image magnifications in orthogonal directions of larger and smaller divergence of an incident light beam, N is the refractive index of the single lens element for a design wavelength, CL is the distance between the light source and the point of focus of the beam focusing lens, $L_1$ is the distance between the vertex of the surface of the single lens element on the light source side and the light source, $L_2$ is the distance between the vertex of the surface of the single lens element on the point of focus side and the point of focus, and the distances CL, $L_1$, and $L_2$ are calculated distances that are calculated based on no cover glass being present in the combination.

Conditions (1) and (2) are obtained based on a paraxial magnification formula that applies to the anamorphic aspherical surface based on the anamorphic aspherical surface having a curvature of zero near the optical axis in a specified direction. Therefore, it is easier to determine positions of the emission point, the lens element, and the point of focus that provide efficient collection and focusing of light having different beam diverging angles in the vertical and horizontal directions in the beam focusing lens that consists of a single lens element.

As noted above, the distances CL, $L_1$, and $L_2$ of Conditions (1) and (2) above are determined on the assumption that the cover glass is absent even though a parallel plane, such as a cover glass for the light source, may actually be present between the light source and the beam focusing lens or between the beam focusing lens and the point of focus. In other words, a value resulting from subtracting $(N_{CG} - 1) d_{CG} / N_{CG}$ from the actual geometric distance associated with the use of such a cover glass is used, in which $N_{CG}$ is the refractive index of the cover glass material for a design wavelength and $d_{CG}$ is the thickness of the cover glass.

Similar to Embodiments 1 and 2 above, the beam focusing lens consisting of a single lens element can be made of plastic in order to reduce production costs and make production easier.

As shown in FIGS. 4A-4B, a beam focusing lens 31 consists of a single lens element 31a having an anamorphic aspherical surface that is expressed by Equation (A) on the point of focus side of the single lens element 31a. The single lens element 31a has on its light source side an aspherical surface that is cylindrical in the Y-axis direction (with X-Z cross-sections that appear to be flat as shown in FIG. 4A) and that is expressed by the following equation that defines a cylindrical aspherical surface, hereinafter denoted as a YCYL surface:

$$Z = (Cy \cdot Y^2) / (1 + \{1 - (Ky \cdot Cy^2 \cdot Y^2)\}^{1/2}) + \Sigma (b_i \cdot Y^{2i}) \quad \text{Equation (B)}$$

where

Y is the distance (in mm) from the optical axis in one direction,

Z is the length (in mm) of a line drawn from the point on the cylindrical aspherical surface at the distance Y from the optical axis to the tangential plane of the cylindrical aspherical surface vertex in the one direction, Cy is the curvature (=1/the radius of curvature, R in mm) in the one direction of the cylindrical aspherical surface on the optical axis, Ky is the eccentricity in the one direction, and $b_i$ is the ith aspheric coefficient, with the summation extending over i.

Table 5 below lists the surface number #, in order from the light source side, the radius of curvature R (in mm) of each surface on the optical axis, the on-axis surface spacing D (in mm), as well as the refractive index N (at a wavelength of 815 nm) of each optical element for the semiconductor laser cover glass 6 and the beam focusing lens 31 of Embodiment 3. In Table 5, ANA denotes an anamorphic aspherical surface as previously defined and YCYL denotes a cylindrical aspherical surface as previously defined that is cylindrical in the Y-axis direction as shown in FIGS. 4A-4B.

TABLE 5

| # | R | D | N |
|---|---|---|---|
| 1 | ∞ | 0.250 | 1.51002 |
| 2 | ∞ | 1.000 | |
| 3 | YCYL | 6.507 | 1.87190 |
| 4 | ANA | | |

Surfaces 1 and 2 in Table 5 are planar surfaces of a semiconductor laser cover glass.

Table 6 below lists the values of the constants Cy and Ky and the aspherical coefficients $b_2$-$b_5$, which are also aspherical constants, used in Equation (B) above for the YCYL surface (i.e., surface #3) in Table 5. Aspherical coefficients that are not present in Table 6 are zero. An "E" in the data indicates that the number following the "E" is the exponent to the base 10. For example, "1.0E−2" represents the number $1.0 \times 10^{-2}$.

TABLE 6

| Aspherical Constant | Value |
|---|---|
| Cy | 4.211634122E−1 |
| $b_2$ | −1.044340238E−2 |
| $b_3$ | 2.033740705E−3 |
| $b_4$ | −2.340970995E−4 |
| $b_5$ | 1.227989903E−5 |
| Ky | 0.000000000 |

Table 7 below lists the values of the constants Cx, Cy, Kx, Ky, the first aspherical coefficients $A_2$-$A_5$ and the second aspherical coefficients $B_2$-$B_5$, which are also aspherical constants, used in Equation (A) above for the ANA surface (i.e., surface #4) of Table 5. Aspherical coefficients that are not present in Table 7 are zero. An "E" in the data indicates that the number following the "E" is the exponent to the base 10. For example, "1.0E−2" represents the number $1.0 \times 10^{-2}$.

TABLE 7

| Aspherical Constant | Value |
|---|---|
| Cx | −3.705451368E−1 |
| Cy | −1.492659574E−1 |
| $A_2$ | 6.817899463E−3 |
| $A_3$ | 4.016025206E−5 |
| $A_4$ | 6.314871366E−5 |
| $A_5$ | −5.272582029E−6 |
| Kx | 0.000000000 |
| Ky | 0.000000000 |

TABLE 7-continued

| Aspherical Constant | Value |
|---|---|
| $B_2$ | 5.070231787E−1 |
| $B_3$ | −1.301310154 |
| $B_4$ | 1.324276009 |
| $B_5$ | −6.044321981E−1 |

In Embodiment 3, the design wavelength is 815 nm and the various distances listed below are based on using light of that wavelength. The distance between the light source side surface $S_3$ of the single lens element 31*a* and the emission point 4 of the light source is −3.091 mm. This distance would be −3.006 mm if the cover glass 6 of the semiconductor laser were not present, and the distance between the light source side surface $S_3$ of the single lens element 31*a* and the emission point 4 of the light source without the cover glass present will be denoted as the distance $L_1$. The distance $L_2$ between the beam focusing side surface $S_4$ of the single lens element 31*a* and the point of focus 5 is 5.902 mm. The distance between the emission point 4 and the point of focus 5 is 15.500 mm. This distance would be 15.416 mm if the cover glass 6 of the semiconductor laser were not present, and the distance between the emission point 4 and the point of focus 5 without the cover glass will be denoted as the distance CL. The focal length of the beam focusing lens 31 in the X-Z cross-section is 3.095 mm, and the focal length of the beam focusing lens 31 in the Y-Z cross-section is 3.019 mm. The image magnification in the X-Z cross-section is −0.90694. The image magnification in the Y-Z cross-section is −2.23154 mm.

Embodiment 3 of the present invention does not satisfy Conditions (1) and (2) above because the anamorphic aspherical surface of the beam focusing lens does not have a curvature of zero on the optical axis in a specified direction. In particular, the right side of the equation of Condition (1) has a value of about −4.02 mm, which is different from the value of $L_1$ of −3.006 mm, and the right side of the equation of Condition (2) has a value of about 6.17 mm, which is different from the value of $L_2$ of 5.902 mm.

Figure 9:
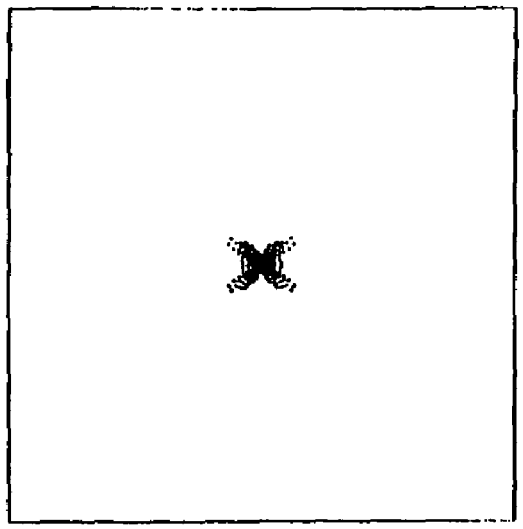
FIG. 9 is a light spot diagram at the plane of focus of the beam focusing lens of Embodiment 3 of the present invention.

FIG. 9 is a light spot diagram at the plane of focus of the beam focusing lens 31 of Embodiment 3 of the present invention. The plane of focus is perpendicular to the Z-axis, the optical axis, of the beam focusing lens 31. In this light spot diagram, the semiconductor laser light source and the spot diagram scale are provided in the same manner as for the prior art embodiment described previously with regard to FIG. 12. By comparing FIG. 9 and FIG. 12, it is obvious that the beam focusing lens 31 of Embodiment 3 of the present invention provides a simple lens structure that efficiently collects and focuses light diverging in the vertical and horizontal directions but also efficiently collects and focuses to a central area light diverging in other directions where insufficient light collection and focusing is observed in the prior art lens structures.

Embodiment 4

FIGS. 5A-5B are orthogonal cross-sectional schematic diagrams of a beam focusing lens of Embodiment 4 of the present invention. Embodiment 4 is similar to Embodiment 3. As shown in FIGS. 5A-5B, a beam focusing lens 41 consists of a single lens element 41*a* having positive refractive power. As shown in FIGS. 5A-5B, the single lens element 41*a* has an anamorphic aspherical surface that is expressed by Equation (A) above on the point of focus side surface of the single lens element 41a. The single lens element 41a has on its light source side surface an aspherical surface that is cylindrical in the Y-axis direction (with X-Z cross-sections that appear to be flat as shown in FIG. 5A), that is, a cylindrical aspherical surface or YCYL surface, that is expressed by Equation (B) above. The single lens element 41a is made of plastic. Embodiment 4 differs from Embodiment 3 in its lens element configuration such as some different aspherical constants of the ANA surface and the YCYL surface, one different optical element surface spacing, and one different refractive index.

Table 8 below lists the surface number #, in order from the light source side, the radius of curvature R (in mm) of each surface on the optical axis, the on-axis surface spacing D (in mm), as well as the refractive index N (at a wavelength of 815 nm) of each optical element for the semiconductor laser cover glass 6 and the beam focusing lens 41 of Embodiment 4. In Table 8, ANA denotes an anamorphic aspherical surface as previously defined and YCYL denotes a cylindrical aspherical surface as previously defined that is cylindrical in the Y-axis direction as shown in FIGS. 5A-5B.

TABLE 8

| # | R | D | N |
|---|---|---|---|
| 1 | ∞ | 0.250 | 1.51002 |
| 2 | ∞ | 1.000 | |
| 3 | YCYL | 5.007 | 1.57039 |
| 4 | ANA | | |

Surfaces #1 and #2 in Table 8 are planar surfaces of a semiconductor laser cover glass.

Table 9 below lists the values of the constants Cy and Ky and the aspherical coefficients $b_2$-$b_5$, which are also aspherical constants, used in Equation (B) above for the YCYL surface (i.e., surface #3) of Table 8. Aspherical coefficients that are not present in Table 9 are zero. An "E" in the data indicates that the number following the "E" is the exponent to the base 10. For example, "1.0E−2" represents the number $1.0\times10^{-2}$.

TABLE 9

| Aspherical Constant | Value |
|---|---|
| Cy | 6.193635451E−1 |
| $b_2$ | −1.662546201E−2 |
| $b_3$ | 2.674316721E−3 |
| $b_4$ | −3.085165458E−4 |
| $b_5$ | 1.818630205E−5 |
| Ky | 0.000000000 |

Table 10 below lists the values of the constants Cx, Cy, Kx, Ky, the first aspherical coefficients $A_2$-$A_5$ and the second aspherical coefficients $B_2$-$B_5$ (which are also aspherical constants) used in Equation (A) above for the ANA surface (i.e., surface #4) of Table 8. Aspherical coefficients that are not present in Table 10 are zero. An "E" in the data indicates that the number following the "E" is the exponent to the base 10. For example, "1.0E−2" represents the number $1.0\times10^{-2}$.

TABLE 10

| Aspherical Constant | Value |
|---|---|
| Cx | −5.222113997E−1 |
| Cy | 0.000000000 |
| $A_2$ | 5.677743052E−3 |
| $A_3$ | −1.169488007E−4 |
| $A_4$ | 3.386249768E−6 |
| $A_5$ | −2.969056060E−7 |
| Kx | 0.000000000 |
| Ky | 0.000000000 |
| $B_2$ | 1.231971641E−1 |
| $B_3$ | −6.179860987E−1 |
| $B_4$ | −1.109926177 |
| $B_5$ | −9.535937050E−1 |

In Embodiment 4, the design wavelength is 815 nm and the various distances listed below are based on using light of that wavelength. The distance between the light source side surface $S_3$ of the single lens element 41a and the emission point 4 of the light source is −4.124 mm. This distance would be −4.040 mm if the cover glass 6 of the semiconductor laser were not present, and the distance between the light source side surface $S_3$ of the single lens element 41a and the emission point 4 of the light source without the cover glass present will be denoted as the distance $L_1$. The distance $L_2$ between the beam focusing side surface $S_4$ of the single lens element 41a and the point of focus 5 is 6.269 mm. The distance between the emission point 4 and the point of focus 5 is 15.400 mm. This distance would be 15.316 mm if the cover glass 6 of the semiconductor laser were not present, and the distance between the emission point 4 and the point of focus 5 without the cover glass present will be denoted as the distance CL. The focal length of the beam focusing lens 41 in the X-Z cross-section is 3.357 mm, and the focal length of the beam focusing lens 41 in the Y-Z cross-section is 2.831 mm. The image magnification in the X-Z cross-section is −0.86731. The image magnification in the Y-Z cross-section is −2.34108 mm.

The beam focusing lens 41 of Embodiment 4 has on the beam focus side an anamorphic aspherical surface having a curvature of zero on the optical axis in the Y-Z cross-section and satisfies Conditions (1) and (2) above. FIGS. 5A and 5B show the distances CL, $L_1$, and $L_2$, as defined previously, as well as the thickness $d_{CG}$ of the cover glass 6 for Embodiment 4 of the present invention. With the semiconductor laser light source and the beam focus point being arranged so as to satisfy Conditions (1) and (2) above, the beam focusing lens 41 of Embodiment 4 can efficiently collect and focus light having different beam diverging angles in the vertical and horizontal directions to a specified point.

Figure 10:
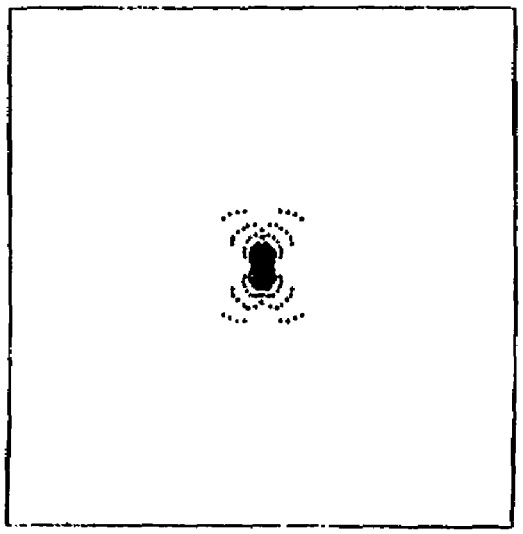
FIG. 10 is a light spot diagram at the plane of focus of the beam focusing lens of Embodiment 4 of the present invention.

FIG. 10 is a light spot diagram at the plane of focus of the beam focusing lens 41 of Embodiment 4 of the present invention. The plane of focus is perpendicular to the Z-axis, the optical axis, of the beam focusing lens 41. In this light spot diagram, the semiconductor laser light source and the spot diagram scale are provided in the same manner as for the prior art embodiment described previously with regard to FIG. 12. By comparing FIG. 10 and FIG. 12, it is obvious that the beam focusing lens 41 of Embodiment 4 of the present invention provides a simple lens structure that efficiently collects and focuses light diverging in the vertical and horizontal directions but also efficiently collects and focuses to a central area light diverging in other directions where insufficient light collection and focusing is observed in the prior art lens structures.

Embodiment 5

Figure 6A:
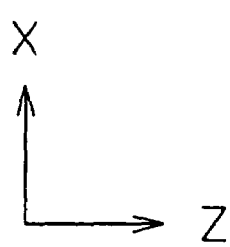
FIGS. 6A-6B are orthogonal cross-sectional schematic diagrams of a beam focusing lens of Embodiment 5 of the present invention.
Figure 6A:
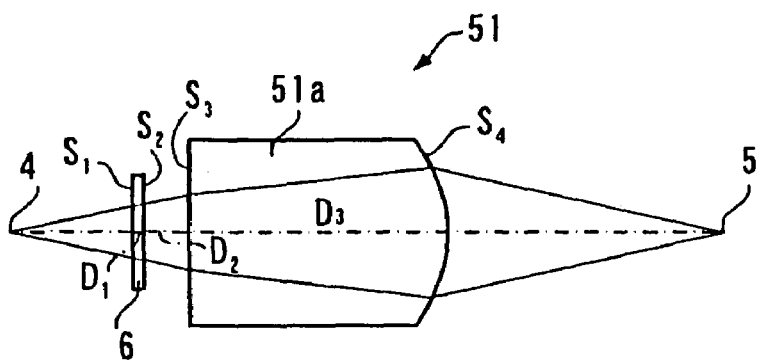
Figure 6B:
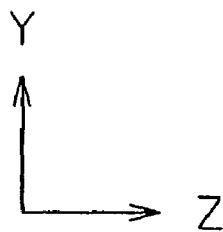
Figure 6B:
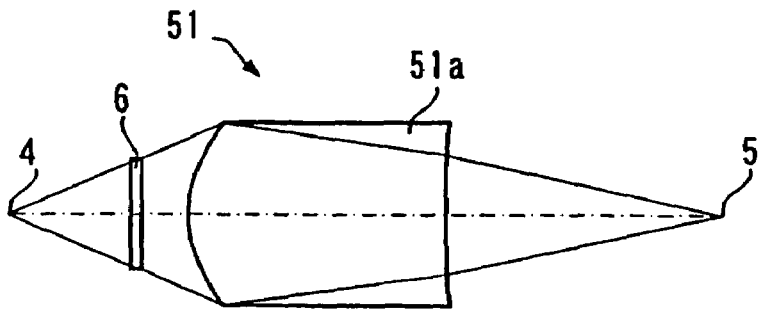

FIGS. 6A-6B are orthogonal cross-sectional schematic diagrams of a beam focusing lens of Embodiment 5 of the present invention. Embodiment 5 is very similar to Embodiment 4. As shown in FIGS. 6A-6B, a beam focusing lens 51 consists of a single lens element 51a having positive refractive power. As shown in FIGS. 6A-6B, the single lens element 51a has an anamorphic aspherical surface that is expressed by Equation (A) above on the point of focus side surface of the single lens element 51a. The single lens element 51a has on its light source side surface an aspherical surface that is cylindrical in the Y-axis direction (with X-Z cross-sections that appear to be flat as shown in FIG. 6A), that is, a cylindrical aspherical surface or YCYL, that is expressed by Equation (B) above. The single lens element 51a is made of glass. Embodiment 5 differs from Embodiment 4 in its lens element configuration such as some different aspherical constants of the ANA surface and the YCYL surface, one different optical element surface spacing, and one different refractive index.

Table 11 below lists the surface number #, in order from the light source side, the radius of curvature R (in mm) of each surface on the optical axis, the on-axis surface spacing D (in mm), as well as the refractive index N (at a wavelength of 815 nm) of each optical element for the semiconductor laser cover glass 6 and the beam focusing lens 51 of Embodiment 5. In Table 11, ANA denotes an anamorphic aspherical surface as previously defined and YCYL denotes a cylindrical aspherical surface as previously defined that is cylindrical in the Y-axis direction as shown in FIGS. 6A-6B.

TABLE 11

| # | R | D | N |
|---|---|---|---|
| 1 | ∞ | 0.250 | 1.51002 |
| 2 | ∞ | 1.000 | |
| 3 | YCYL | 5.616 | 1.87190 |
| 4 | ANA | | |

Surfaces 1 and 2 in Table 11 are planar surfaces of a semiconductor laser cover glass.

Table 12 below lists the values of the constants Cy and Ky and the aspherical coefficients $b_2$-$b_5$, which are also aspherical constants, used in Equation (B) above for the YCYL surface (i.e., surface #3) of Table 11. Aspherical coefficients that are not present in Table 12 are zero. An "E" in the data indicates that the number following the "E" is the exponent to the base 10. For example, "1.0E-2" represents the number $1.0 \times 10^{-2}$.

TABLE 12

| Aspherical Constant | Value |
|---|---|
| Cy | 4.306182724E-1 |
| $b_2$ | -9.298426129E-3 |
| $b_3$ | 1.291237827E-3 |
| $b_4$ | -1.445035336E-4 |
| $b_5$ | 8.729638452E-6 |
| Ky | 0.000000000 |

Table 13 below lists the values of the constants Cx, Cy, Kx, Ky, the first aspherical coefficients $A_2$-$A_5$ and the second aspherical coefficients $B_2$-$B_5$, which are also aspherical constants, used in Equation (A) above for the ANA surface (i.e., surface #4) of Table 11. Aspherical coefficients that are not present in Table 13 are zero. An "E" in the data indicates that the number following the "E" is the exponent to the base 10. For example, "1.0E-2" represents the number $1.0 \times 10^{-2}$.

TABLE 13

| Aspherical Constant | Value |
|---|---|
| Cx | -3.630723386E-1 |
| Cy | 0.000000000 |
| $A_2$ | 4.158049265E-3 |
| $A_3$ | -2.998010853E-5 |
| $A_4$ | 4.226344557E-6 |
| $A_5$ | -1.642757860E-7 |
| Kx | 0.000000000 |
| Ky | 0.000000000 |
| $B_2$ | 1.688714511E-1 |
| $B_3$ | -1.188480225 |
| $B_4$ | -9.583393761E-1 |
| $B_5$ | -9.868290754E-1 |

In Embodiment 5, the design wavelength is 815 nm and the various distances listed below are based on using light of that wavelength. The distance between the light source side surface $S_3$ of the single lens element 51a and the emission point 4 of the light source is -3.886 mm. This distance would be -3.801 mm if the cover glass 6 of the semiconductor laser were not present, and the distance between the light source side surface $S_3$ of the single lens element 51a and the emission point 4 of the light source without the cover glass 6 present will be denoted as the distance $L_1$. The distance $L_2$ between the beam focusing side surface $S_4$ of the single lens element 51a and the point of focus 5 is 5.899 mm. The distance between the emission point 4 and the point of focus 5 is 15.400 mm. This distance would be 15.316 mm if the cover glass 6 of the semiconductor laser were not present, and the distance between the emission point 4 and the point of focus 5 without the cover glass present will be denoted as the distance CL. The focal length of the beam focusing lens 51 in the X-Z cross-section is 3.159 mm, and the focal length of beam focusing lens 51 in the Y-Z cross-section is 2.663 mm. The image magnification in the X-Z cross-section is -0.86728. The image magnification in the Y-Z cross-section is -2.34108 mm.

The beam focusing lens 51 of Embodiment 5 has, on the beam focus side surface, an anamorphic aspherical surface having a curvature of zero on the optical axis in the Y-Z cross-section and satisfies Conditions (1) and (2) above with the distances CL, $L_1$, and $L_2$ being defined as set forth previously and explained previously with regard to Embodiment 4 and FIGS. 5A-5B. With the semiconductor laser light source and the beam focus point being arranged so as to satisfy Conditions (1) and (2) above, the beam focusing lens 51 of Embodiment 5 can efficiently collect and focus light having different beam diverging angles in the vertical and horizontal directions to a specified point.

Figure 11:
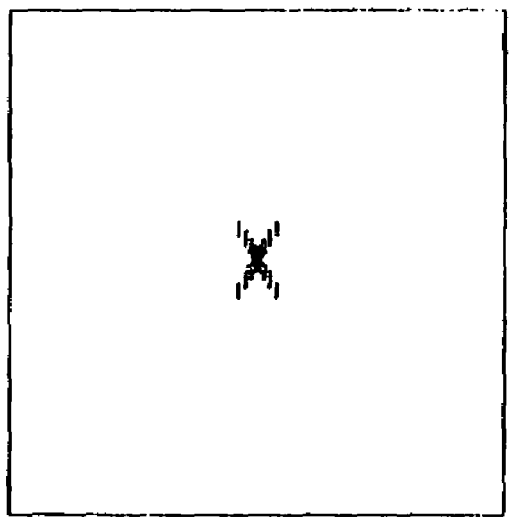
FIG. 11 is a light spot diagram at the plane of focus of the beam focusing lens of Embodiment 5 of the present invention.

FIG. 11 is a light spot diagram at the plane of focus of the beam focusing lens 51 of Embodiment 5 of the present invention. The plane of focus is perpendicular to the Z-axis, the optical axis, of the beam focusing lens 51. In this light spot diagram, the semiconductor laser light source and the spot diagram scale are provided in the same manner as for the prior art embodiment described previously with regard to FIG. 12. By comparing FIG. 11 and FIG. 12, it is obvious that the beam focusing lens 51 of Embodiment 5 of the present invention provides a simple lens structure that efficiently collects and focuses light diverging in the vertical and horizontal directions but also efficiently collects and focuses to a central area light diverging in other directions where insufficient light collection and focusing is observed in the prior art lens structures.

The beam focusing lens of the present invention is not limited to the embodiments described above but may be varied in numerous ways.

For example, the beam focusing lenses described above are designed for collecting and focusing light from a semiconductor laser and introducing it into an optical fiber having a core diameter of 100 μm or smaller. However, the beam focusing lens of the present invention is not limited to this. The optical fiber may have a larger or smaller core diameter depending upon the mode. Furthermore, the beam focusing lens of the present invention may be used in other applications as a beam focusing lens for collecting and focusing light having different beam diverging angles in the major and minor axis directions. Also, it may be used as a beam focusing lens that receives light having nearly circular cross-sections and emits light having different converging angles in the major and minor axis directions. Additionally, it is desirable that the anamorphic aspherical surface or surfaces be designed according to the application of the beam focusing lens.

The beam focusing lens of the present invention may variously combine use of a cylindrical aspherical surface with use of an anamorphic aspherical surface. Using a cylindrical aspherical surface allows greater freedom in the lens design for collecting and focusing light having different beam diverging angles in the vertical and horizontal directions to a specified point of focus. Additionally, a cylindrical aspherical surface is not confined to the aspherical surface that is cylindrical in the Y axis direction as set forth in embodiments described above. For example, an aspherical surface that is cylindrical in the X axis direction expressed by the following Equation (C), as related to the similar Equation (B) above, can be used:

$$Z=(Cx \cdot X^2)/(1+\{1-(Kx \cdot Cx^2 \cdot X^2)\}^{1/2})+\Sigma(a_i X^{2i}) \quad \text{Equation (C)}$$

where
- X is the distance (in mm) from the optical axis in one direction,
- Z is the length (in mm) of a line drawn from the point on the cylindrical aspherical surface at the distance X from the optical axis to the tangential plane of the cylindrical aspherical surface vertex in the one direction,
- Cx is the curvature (=1/the radius of curvature, R in mm) in the one direction of the cylindrical aspherical surface on the optical axis,
- Kx is the eccentricity in the one direction, and
- $a_i$ is the ith aspheric coefficient, with the summation extending over i.

The present invention is not limited to the aforementioned embodiments, nor to the variations described above, as it will be obvious that various alternative implementations are possible. All such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A beam focusing lens having an optical axis for focusing at a point of focus a light beam having different angles of divergence in orthogonal directions perpendicular to the optical axis, wherein the beam focusing lens consists of:
    a first lens component having positive refractive power;
    a second lens component having positive refractive power;
    at least one surface of at least one of said first lens component and said second lens component is an anamorphic aspherical surface; and
    the shape of the anamorphic aspherical surface satisfies the following condition:

$$Z=(Cx \cdot X^2+Cy \cdot Y^2)/(1+\{1-(Kx \cdot Cx^2 \cdot X^2+Ky \cdot Cy^2 \cdot Y^2)\}^{1/2})+\Sigma A_i\{(1-B_i)X^2+(1+B_i)Y^2\}^i$$

where
- X is the distance (in mm) from the optical axis in a first direction of a point on the anamorphic aspherical surface,
- Y is the distance (in mm) from the optical axis in a second direction that is orthogonal to the first direction of the point on the anamorphic aspherical surface,
- Z is the length (in mm) of a line drawn from the point on the anamorphic aspherical surface at the coordinate distances X and Y from the optical axis to the tangential plane of the anamorphic aspherical surface vertex,
- Cx is the curvature (=1/the radius of curvature, R in mm) in the first direction of the anamorphic aspherical surface on the optical axis,
- Cy is the curvature (=1/the radius of curvature, R in mm) in the second direction of the anamorphic aspherical surface on the optical axis,
- Kx is the eccentricity in the first direction,
- Ky is the eccentricity in the second direction,
- $A_i$ is the ith first aspherical coefficient,
- $B_i$ is the ith second aspherical coefficient, and
- the summation extends over i.

2. The beam focusing lens of claim 1, wherein each of said first lens component and said second lens component consists of a lens element.

3. The beam focusing lens of claim 1, wherein a lens element of at least one of said first lens component and said second lens component is made of plastic.

4. The beam focusing lens of claim 2, wherein the lens element of at least one of said first lens component and said second lens component is made of plastic.

5. The beam focusing lens of claim 1, wherein the lens component that is closer to the point of focus includes a lens element made of plastic.

6. The beam focusing lens of claim 2, wherein the lens element that is closer to the point of focus is made of plastic.

7. A beam focusing lens having an optical axis for focusing at a point of focus a light beam having different angles of divergence in orthogonal directions perpendicular to the optical axis, wherein the beam focusing lens consists of:
    a single lens component that consists of a single lens element and that includes at least one anamorphic aspherical surface in combination with a light source for providing the light beam having different angles of divergence, wherein the following conditions are satisfied:

$$L_1=\{N \cdot CL \cdot (\beta_2-1)\}/\{(\beta_2-N)(N \cdot \beta_1-1)+(N-1)(N-1)\beta_2\}$$

$$L_2=\{N \cdot \beta_2 \cdot CL(1-\beta_1)\}/\{\beta_2(N-1)(1-N)+(N \cdot \beta_1-1)(N-\beta_2)\}$$

where
- $\beta_1$ is the larger of the absolute values of two image magnifications in orthogonal directions of larger and smaller divergence of an incident light beam, $\beta_1$ is the smaller of the absolute values of the two image magnifications in orthogonal directions of larger and smaller divergence of an incident light beam, N is the refractive index of the single lens element for a design wavelength, CL is the distance between the light source and the point of focus of the beam focusing lens, $L_1$ is the distance between the vertex of the surface of the single lens element on the light source side and the light source, $L_2$ is the distance between the vertex of the surface of the single lens element on the point of focus side and the point of focus, and the distances CL, $L_1$, and $L_2$ are calculated distances that are calculated based on no cover glass being present in the combination.

8. The combination of claim 7, wherein the single lens element is made of plastic.

9. A beam focusing lens having an optical axis for focusing at a Point of focus a light beam having different angles of divergence in orthogonal directions perpendicular to the optical axis, wherein the beam focusing lens consists of:

a single lens component that includes at least one anamorphic aspherical surface, and the shape of the anamorphic aspherical surface satisfies the following condition:

$$Z=(Cx \cdot X^2 + Cy \cdot Y^2)/(1+\{1-(Kx \cdot Cx^2 \cdot X^2 + Ky \cdot Cy^2 \cdot Y^2)\}^{1/2}) + \Sigma A_i \{(1-B_i)X^2 + (1+B_i)Y^2\}^i$$

where

X is the distance (in mm) from the optical axis in a first direction of a point on the anamorphic aspherical surface, Y is the distance (in mm) from the optical axis in a second direction that is orthogonal to the first direction of the point on the anamorphic aspherical surface, Z is the length (in mm) of a line drawn from the point on the anamorphic aspherical surface at the coordinate distances X and Y from the optical axis to the tangential plane of the anamorphic aspherical surface vertex, Cx is the curvature (=1/the radius of curvature, R in mm) in the first direction of the anamorphic aspherical surface on the optical axis, Cy is the curvature (=1/the radius of curvature, R in mm) in the second direction of the anamorphic aspherical surface on the optical axis, Kx is the eccentricity in the first direction, Ky is the eccentricity in the second direction, $A_i$ is the ith first aspherical coefficient, $B_i$ is the ith second aspherical coefficient, and the summation extends over i.

10. A beam focusing lens having an optical axis for focusing at a point of focus a light beam having different angles of divergence in orthogonal directions perpendicular to the optical axis, wherein the beam focusing lens consists of:

a single lens component that includes at least one anamorphic aspherical surface, and the single lens component consists of a single lens element; and the shape of the anamorphic aspherical surface satisfies the following condition:

$$Z=(Cx \cdot X^2 + Cy \cdot Y^2)/(1+\{1-(Kx \cdot Cx^2 \cdot X^2 + Ky \cdot Cy^2 \cdot Y^2)\}^{1/2}) + \Sigma A_i \{(1-B_i)X^2 + (1+B_i)Y^2\}^i$$

where

X is the distance (in mm) from the optical axis in a first direction of a point on the anamorphic aspherical surface, Y is the distance (in mm) from the optical axis in a second direction that is orthogonal to the first direction of the point on the anamorphic aspherical surface, Z is the length (in mm) of a line drawn from the point on the anamorphic aspherical surface at the coordinate distances X and Y from the optical axis to the tangential plane of the anamorphic aspherical surface vertex, Cx is the curvature (=1/the radius of curvature, R in mm) in the first direction of the anamorphic aspherical surface on the optical axis.

Cy is the curvature (=1/the radius of curvature, R in mm) in the second direction of the anamorphic aspherical surface on the optical axis, Kx is the eccentricity in the first direction, Ky is the eccentricity in the second direction, $A_i$ is the ith first aspherical coefficient, $B_i$ is the ith second aspherical coefficient, and the summation extends over i.

11. The combination of claim 7, wherein the shape of anamorphic aspherical surface satisfies the following condition:

$$Z=(Cx \cdot X^2 + Cy \cdot Y^2)/(1+\{1-(Kx \cdot Cx^2 \cdot X^2 + Ky \cdot Cy^2 \cdot Y^2)\}^{1/2}) + \Sigma A_i \{(1-B_i)X^2 + (1+B_i)Y^2\}^i$$

where

X is the distance (in mm) from the optical axis in a first direction of a point on the anamorphic aspherical surface, Y is the distance (in mm) from the optical axis in a second direction that is orthogonal to the first direction of the point on the anamorphic aspherical surface, Z is the length (in mm) of a line drawn from the point on the anamorphic aspherical surface at the coordinate distances X and Y from the optical axis to the tangential plane of the anamorphic aspherical surface vertex, Cx is the curvature (=1/the radius of curvature, R in mm) in the first direction of the anamorphic aspherical surface on the optical axis.

Cy is the curvature (=1/the radius of curvature, R in mm) in the second direction of the anamorphic aspherical surface on the optical axis, Kx is the eccentricity in the first direction, Ky is the eccentricity in the second direction, $A_i$ is the ith first aspherical coefficient, $B_i$ is the ith second aspherical coefficient, and the summation extends over i.

12. The combination of claim 7, and further including an optical fiber, wherein:

the light source includes a semiconductor laser; and the point of focus is at one end of the optical fiber.

13. The combination of claim 11, and further including an optical fiber, wherein:

the light source includes a semiconductor laser; and the point of focus is at one end of the optical fiber.

14. The beam focusing lens of claim 1 in combination with a light source for providing the light beam having different angles of divergence, wherein:

the light source includes a semiconductor laser; and the point of focus is at one end of an optical fiber.

* * * * *

UNITED STATES PATENT AND TRADEMARK OFFICE
CERTIFICATE OF CORRECTION

PATENT NO. : 7,580,601 B2
APPLICATION NO. : 10/991484
DATED : August 25, 2009
INVENTOR(S) : Katsuma et al.

It is certified that error appears in the above-identified patent and that said Letters Patent is hereby corrected as shown below:

In col. 3
Lines 51 - 52, change Equation (A) to read as follows:

-- $Z = (Cx \cdot X^2 + Cy \cdot Y^2)/ (1 + \{1 - (Kx \cdot Cx^2 \cdot X^2 + Ky \cdot Cy^2 \cdot Y^2)\}^{1/2}) + \Sigma A_i \{(1 - B_i) X^2 + (1 + B_i) Y^2\}^i$ ... Equation (A) --;

In col. 19
Line 19, change "Point" to -- point --;
Lines 25 - 26, change the equation to read as follows:

-- $Z = (Cx \cdot X^2 + Cy \cdot Y^2)/ (1 + \{1 - (Kx \cdot Cx^2 \cdot X^2 + Ky \cdot Cy^2 \cdot Y^2)\}^{1/2}) + \Sigma A_i \{(1 - B_i) X^2 + (1 + B_i) Y^2\}^i$ --;

Lines 60-61, change the equation to read as follows:

-- $Z = (Cx \cdot X^2 + Cy \cdot Y^2)/ (1 + \{1 - (Kx \cdot Cx^2 \cdot X^2 + Ky \cdot Cy^2 \cdot Y^2)\}^{1/2}) + \Sigma A_i \{(1 - B_i) X^2 + (1 + B_i) Y^2\}^i$ --; and In col. 20
Lines 25 - 26, change the equation to read as follows:

-- $Z = (Cx \cdot X^2 + Cy \cdot Y^2)/ (1 + \{1 - (Kx \cdot Cx^2 \cdot X^2 + Ky \cdot Cy^2 \cdot Y^2)\}^{1/2}) + \Sigma A_i \{(1 - B_i) X^2 + (1 + B_i) Y^2\}^i$ --.

Signed and Sealed this

Tenth Day of November, 2009

David J. Kappos
*Director of the United States Patent and Trademark Office*